United States Patent
Britt et al.

(10) Patent No.: US 9,926,803 B2
(45) Date of Patent: Mar. 27, 2018

(54) TURBINE CONTROL DEVICE PROGNOSTICS

(71) Applicant: Woodward, Inc., Fort Collins, CO (US)

(72) Inventors: Tena K. Britt, Loveland, CO (US); Kevin Greeb, Fort Collins, CO (US); Thomas M Krause, Fort Collins, CO (US); Craig Mawle, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/195,373

(22) Filed: Jun. 28, 2016

(65) Prior Publication Data

US 2017/0370244 A1    Dec. 28, 2017

(51) Int. Cl.
| | | |
|---|---|---|
| G06F 19/00 | (2011.01) | |
| F01D 21/00 | (2006.01) | |
| F01D 17/14 | (2006.01) | |
| F02C 7/232 | (2006.01) | |
| G05B 15/02 | (2006.01) | |

(52) U.S. Cl.
CPC ........... *F01D 21/003* (2013.01); *F01D 17/14* (2013.01); *F02C 7/232* (2013.01); *G05B 15/02* (2013.01); *F05D 2220/30* (2013.01); *F05D 2260/80* (2013.01)

(58) Field of Classification Search
CPC .............................. F01D 21/003; F01D 17/14
See application file for complete search history.

(56) References Cited

U.S. PATENT DOCUMENTS

| 5,646,600 | A | 7/1997 | Abdel-Malek et al. | |
|---|---|---|---|---|
| 6,118,186 | A * | 9/2000 | Scott ........................ | H02P 9/04 290/1 A |
| 6,530,277 | B2 | 3/2003 | Kumpfmueller | |
| 6,725,876 | B2 | 4/2004 | Bowman et al. | |
| 8,271,141 | B2 | 9/2012 | Cummings et al. | |
| 8,509,952 | B2 | 8/2013 | Stelter et al. | |
| 8,521,334 | B2 | 8/2013 | Meier et al. | |
| 8,768,631 | B2 | 7/2014 | Wilke | |
| 8,850,880 | B2 | 10/2014 | Puttmer | |

(Continued)

FOREIGN PATENT DOCUMENTS

| CA | 2059953 | 10/1997 |
|---|---|---|
| CA | 2863096 A1 | 8/2013 |

(Continued)

OTHER PUBLICATIONS

International Search Report and Written Opinion of the International Searching Authority issued in International Application No. PCT/US2017/038698 dated Sep. 29, 2017; 12 pages.

*Primary Examiner* — Adam Alharbi

(74) *Attorney, Agent, or Firm* — Fish & Richardson P.C.

(57) ABSTRACT

Providing wear-related prognostics and diagnostics on a turbine engine includes, while operating a turbine control device, tracking a total device travel distance over time by recurrently: selectively identifying actual device movement based on device position data associated with a displacement sensor monitoring the turbine control device; and accumulating an incremental device travel distance corresponding to the identified actual device movement with the total device travel distance.

22 Claims, 9 Drawing Sheets

(56) References Cited

U.S. PATENT DOCUMENTS

| | | | |
|---|---|---|---|
| 8,955,365 B2 | 2/2015 | do Amaral et al. | |
| 2001/0056544 A1* | 12/2001 | Walker | B60R 25/02 726/2 |
| 2005/0218887 A1 | 10/2005 | Twerdochlib | |
| 2009/0055130 A1 | 2/2009 | Pandey et al. | |
| 2009/0205310 A1 | 8/2009 | Hibshman, II | |
| 2010/0152907 A1 | 6/2010 | Meier et al. | |
| 2010/0170583 A1 | 7/2010 | Gessaman | |
| 2010/0305874 A1 | 12/2010 | Meier et al. | |
| 2013/0019683 A1 | 1/2013 | Carder et al. | |
| 2014/0123659 A1 | 5/2014 | Biyani | |
| 2014/0261791 A1 | 9/2014 | Grabau et al. | |
| 2015/0045970 A1 | 2/2015 | Anderson | |
| 2015/0088434 A1 | 3/2015 | Grabau et al. | |
| 2015/0149100 A1 | 5/2015 | Eisenbeis et al. | |
| 2015/0276086 A1 | 10/2015 | Wheeler et al. | |
| 2015/0370277 A1 | 12/2015 | Britt | |
| 2016/0077531 A1 | 3/2016 | Kucera et al. | |

FOREIGN PATENT DOCUMENTS

| | | |
|---|---|---|
| EP | 0452005 A1 | 10/1991 |
| EP | 2584176 A2 | 4/2013 |
| EP | 2867737 A1 | 5/2015 |
| WO | WO2014004602 A1 | 1/2014 |
| WO | WO2014152109 A1 | 9/2014 |
| WO | WO2014168908 A1 | 10/2014 |

* cited by examiner

TURBINE CONTROL DEVICE PROGNOSTICS

TECHNICAL FIELD

This specification generally relates to wear-related prognostics for electrically actuated turbine control devices.

BACKGROUND

Turbine control devices such as fuel control valves and variable vane actuators include numerous components that are subject to wearout failure modes over time. For example, various seals, bearings, gears, leadscrews and other components can cumulatively sustain small, yet significant, wear damage which is proportional to usage of the device, as well as process and ambient conditions. Unforeseen wearout of such components can be highly disruptive. For example, seal wearout, a common field problem seen on turbine fuel control valves, commonly leads to valve leakage, and ultimately costly unplanned outages. Additionally, wearout of the gear train or leadscrew may prevent a valve from properly opening or closing on demand, which could result in unsafe operation. Thus, the ability to detect wearout and to predict the amount of life left in various control device components (e.g., valve seals) is desirable.

SUMMARY

A first aspect includes a driver communicatively coupled to a turbine control device and a turbine engine control unit (ECU). The driver includes a memory, a processor, and instructions stored in the memory and operable when executed by the processor to cause the driver to perform operations that include operating the turbine control device by recurrently: receiving a demand signal from the turbine ECU; and determining and transmitting a desired position to the turbine control device based on the demand signal. The operations further include, during the operating of the turbine control device, tracking a total device travel distance over time by recurrently: selectively identifying actual device movement based on device position data associated with a displacement sensor monitoring the turbine control device; and accumulating an incremental device travel distance corresponding to the identified actual device movement with the total device travel distance.

A second aspect includes a computer-implemented method for providing wear-related prognostics and diagnostics on a turbine engine. The method is executed using one or more processors to perform operations that include operating a turbine control device by recurrently: receiving a demand signal from a turbine engine control unit (ECU); and determining and transmitting a desired position to the turbine control device based on the demand signal. The operations further include, during the operating of the turbine control device, tracking a total device travel distance over time by recurrently: selectively identifying actual device movement based on device position data associated with a displacement sensor monitoring the turbine control device; and accumulating an incremental device travel distance corresponding to the identified actual device movement with the total device travel distance.

A third aspect includes a non-transitory computer-readable storage medium coupled to one or more processors and having instructions stored thereon which, when executed by the one or more processors, cause the one or more processors to perform operations for providing wear-related prognostics and diagnostics on a turbine engine. The operations include operating a turbine control device by recurrently: receiving a demand signal from a turbine engine control unit (ECU); and determining and transmitting a desired position to the turbine control device based on the demand signal. The operations further include, during the operating of the turbine control device, tracking a total device travel distance over time by recurrently: selectively identifying actual device movement based on device position data associated with a displacement sensor monitoring the turbine control device; and accumulating an incremental device travel distance corresponding to the identified actual device movement with the total device travel distance.

In one or more of the above-described aspects, the turbine control device includes at least one of a turbine fuel control valve and a variable vane actuator.

In one or more of the above-described aspects, tracking the total device travel distance further includes filtering a device position signal received from the displacement sensor. In some examples, identifying actual device movement includes: comparing the device position data to a device movement window; and determining that the device position is beyond the device movement window. In some examples, the device movement window includes a predetermined threshold value based on a physical characteristic of the turbine control device. In some examples, the physical characteristic is associated with at least one of a seal, a gear, a bearing, and a leadscrew of the turbine control device. In some examples, the device movement window includes two opposing threshold values. In some examples, tracking the total device travel distance further includes: in response to identifying actual device movement, adjusting the device movement window based on the incremental device travel distance. In some examples, tracking the total device travel distance further includes: calculating the incremental device travel distance as the magnitude between the device position data and the device movement window.

In one or more of the above-described aspects, the operations further include comparing the total device travel distance to an expected travel capability to determine a wear state of the turbine control device. In some examples, determining the wear state of the turbine control device further includes adjusting the expected travel capability based on at least one of: ambient temperature conditions, fuel temperature conditions, fuel pressure conditions, actuator load conditions, and lubrication effectiveness.

In one or more of the above-described aspects, the operations further include automatically altering a parameter for determining the desired device position based on the total device travel distance.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Various embodiments of the present disclosure are related to diagnostic and prognostic techniques for turbine control devices such as fuel control valves and variable vane actuators. In particular, such embodiments are intended to address problems with accurately predicting and detecting wear on various components (e.g., seals, motors, drive trains, gear trains, bearings, and leadscrews) of turbine control devices. Increasing the accuracy of wear detection for high-wear system components can save time and money by preventing unplanned outages, while also ensuring operational efficiency, productivity and safety. Certain embodiments described herein may address these problems and achieve these advantages by tracking the total travel distance of the control device over time as an accumulation of actual device movement (e.g., "actual valve movement" or "actual actuator movement"). Actual device movement corresponds to the detected travel distance of the device where wear of a particular component (e.g., a valve seal) is likely occurring, excluding detected device travel that is unlikely to reflect substantial wear—e.g., detected movement that may be attributed to sensor noise and/or inherent compliance in the system. The total travel distance can be compared to an expected travel capacity corresponding to the particular component to determine its current wear state and predict future wearout failure.

Figure 1:
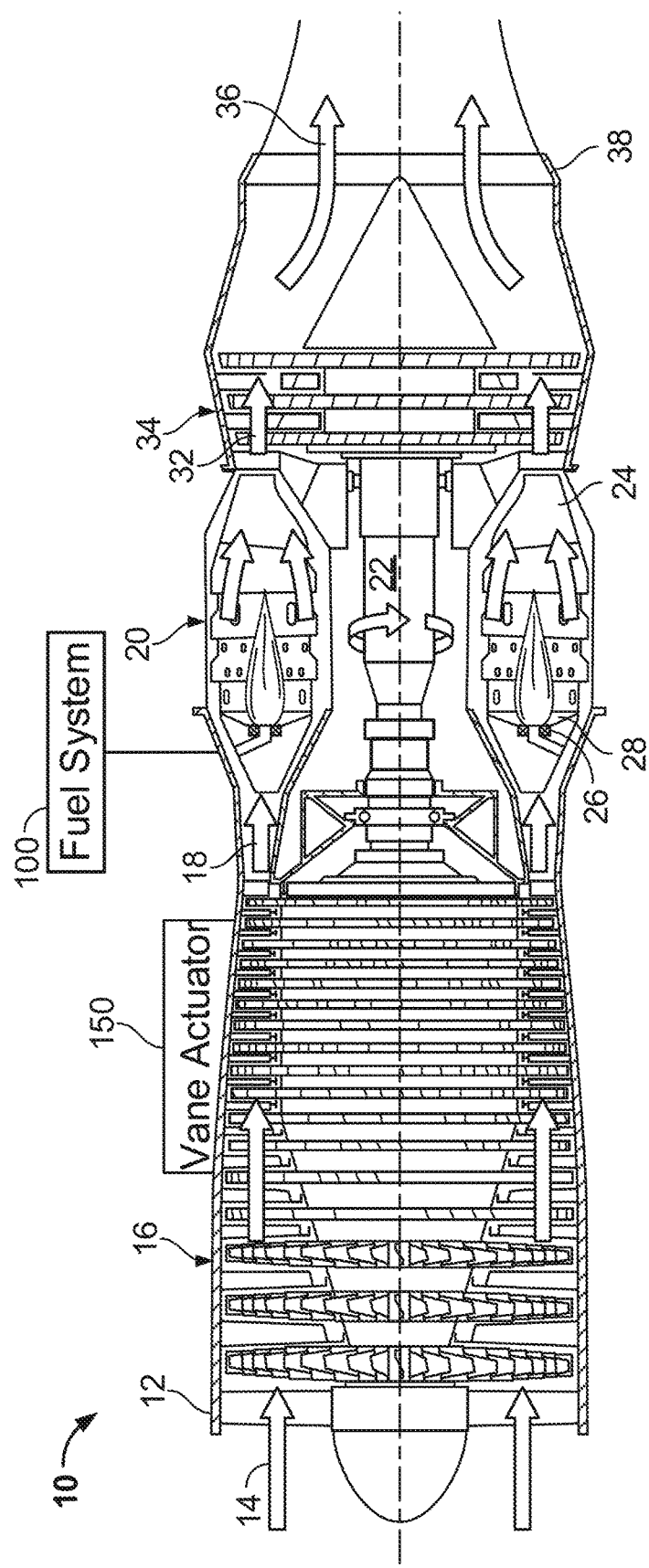
FIG. 1 is a half, side cross-sectional view of a turbine engine.

FIG. 1 depicts an example turbine engine 10 within which various embodiments of the present disclosure may be implemented. The turbine engine 10 is a combustion gas turbine that could be used, for example, to power jet aircrafts. However, it is appreciated that the concepts described in the present disclosure are not so limited, and can be incorporated in the design of various other types of gas turbine engines (e.g., turbofan, turboprop, turboshaft, or industrial/marine engines) and/or steam turbines. As shown, the turbine engine 10 generally facilitates a continuous axial flow of gas. That is, gas generally flows through the engine 10 in the axially downstream direction indicated by the arrows in FIG. 1. The turbine engine 10 includes an intake 12 that receives ambient air 14 and directs the ambient air to a compressor 16. The ambient air 14 is drawn through multiple stages of the compressor 16. In this example, the compressor 16 is a variable vane, axial flow compressor including an actuator 150 for controlling the angular position of one or more sets of variable vanes (e.g., stator vanes and/or inlet guide vanes that are adjustable through multiple angular positions). The variable vanes are used to correct the angle of incidence of the air 14 onto a stage of rotor blades to points that are tolerable without a break down of flow, stall or surge at relatively low pressure ratios and rotor speeds. Thus, the variable vanes operated by actuator 150 ensure that the compressor 16 will operate efficiently over its full speed range. The actuator 150 and its associated controller(s) may incorporate various wear-related diagnostic and prognostic techniques described below.

High-pressure air 18 exiting the compressor 16 is introduced to a combustor 20. In certain instances the combustor 20 is an annular combustor circumscribing the engine's main shaft 22 or a can-type combustor positioned radially outward of the shaft. In this example, the combustor 20 includes a combustion shield 24, multiple fuel injectors 26, and a combustor dome 28. The fuel injectors 26 receive liquid hydrocarbon fuel provided by a fuel system 100. The fuel system 100 may incorporate various wear-related diagnostic and prognostic techniques described below. At the combustor 20, the high-pressure air 18 is mixed with the fuel and ignited to produce heated combustion products 32. The combustion products 32 are passed through multiple stages of a turbine 34. The turbine 34 extracts energy from the high-pressure, high-temperature combustion products 32. Energy extracted from the combustion products 32 by the turbine 34 drives the compressor 16, which is coupled to the turbine by the main shaft 22. In this example, exhaust gas 36 leaving the turbine 34 is accelerated into the atmosphere through an exhaust nozzle 38 to provide thrust or propulsion power. In other implementations, the torque generated by the turbine on the main shaft may be transferred to a generator or gearbox to generate electrical or mechanical power.

In the foregoing description of the turbine engine 10, various items of equipment, such as pipes, valves, pumps, fasteners, fittings, etc., have been omitted to simplify the description. However, those skilled in the art will realize that such conventional equipment can be employed as desired. Those skilled in the art will further appreciate that various components described are recited as illustrative for contextual purposes and do not limit the scope of this disclosure.

Figure 2:
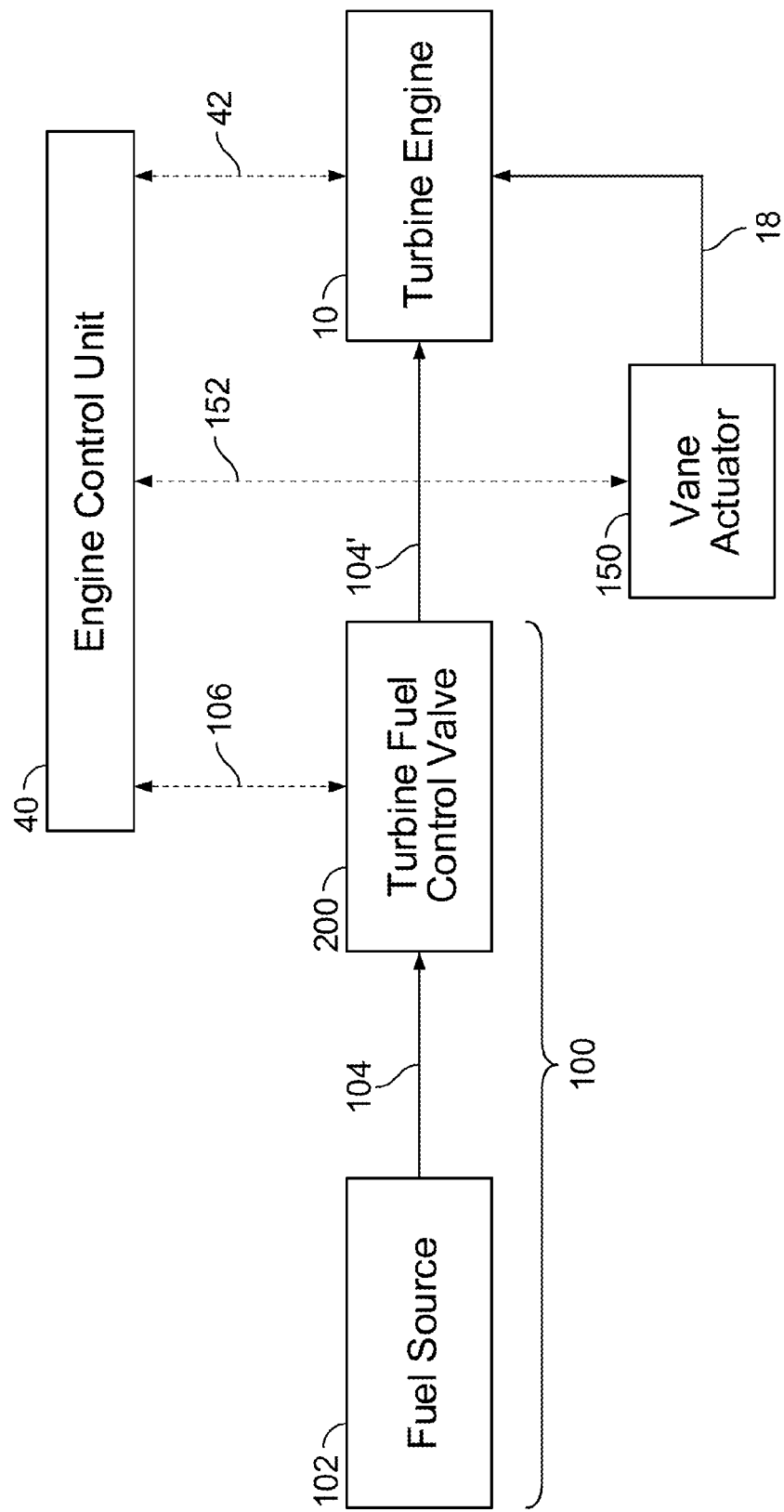
FIG. 2 is a plan view of a fuel system and a variable vane actuator servicing the turbine engine of FIG. 1.

Referring next to FIG. 2, the fuel system 100 is designed to provide a controlled or "metered" flow of fuel to the turbine engine 10 based on fuel demand signals produced by the turbine engine control unit 40. As shown, the fuel system 100 includes a fuel source 102 and a turbine fuel control valve 200. The fuel control valve 200 is fluidically coupled to the turbine engine 10 (e.g., via one or more fluid conduits) and communicatively coupled to the engine control unit (ECU) 40 (e.g., via one or more wired or wireless communication links). As discussed above, the turbine engine 10 is operable to use fuel provided by the fuel source 102 to generate mechanical power. The fuel source 102 may include a large storage tank, a plurality of smaller pressure vessels (e.g., compressed gas cylinders), and/or a fluid transport conduit (e.g., a gas pipeline or a conduit leading from a steam generator). The flow of fuel 104 provided by the fuel source 102 may include any grade or quality of gas-phase or liquid-phase fluid suitable for consumption by the turbine engine 10 (e.g., gaseous fuels ranging from steam to methane to landfill gas to coal gas). In some examples, such as described below with reference to FIG. 3, the fuel control valve 200 includes a valve body slaved to an actuator assembly and a driver for regulating the flow of fuel 104 provided from the fuel source 102, such that the turbine engine 10 receives a metered flow of gaseous fuel 104' suitable for providing a required power output. The ECU 40 sends and receives signals 106,42 to and from the fuel control valve 200 and the turbine engine 10 to ensure proper operation of the turbine engine 10 during use. As one particular example, the fuel control valve 200 may be designed to receive a fuel demand signal 106 from the ECU 40. The fuel demand signal 106 may correspond to a physical mass flow rate of fuel required by the turbine engine 10. As described below, the fuel control valve 200 incorporates a feedback sensor that provides valve position data used to modulate a valve opening to produce the physical mass flow rate of fuel 104'. This same position data can be used to perform wear-related prognostics and diagnostics for various components of the valve body.

Operation of the vane actuator 150 is controlled by the ECU 40 in a similar way. That is, the ECU 40 sends and receives control and feedback signals 152 to and from the vane actuator 150 based on a desired power output of the turbine engine 10. So, for example, the vane actuator 150 may be designed to receive an air demand signal 152 from the ECU 40 corresponding to a physical mass flow rate of high-pressure air 18 required by the turbine engine 10, and subsequently adjust the stator or guide vanes of the compressor 16 to meet the demand. Again, similar to the fuel control valve 200, the vane actuator 150 incorporates a feedback sensor that provides position data usable for the dual purposes of modulating vane angle and performing wear-related prognostics and diagnostics for various components of the vane actuator 150.

As noted above and shown in FIG. 3, the fuel control valve 200 includes a valve body 202, an actuator 204, and an electronic positioning system (referred to herein as a "driver") 206. The valve body 202 includes a frame 208 defining an interior cavity housing a valve element (not shown). The frame 208 includes an inlet pipe 210 and an outlet pipe 212 provided as tubular bodies terminating in outward facing flanges. The inlet pipe 210 is couplable to upstream piping leading (directly or indirectly) from the fuel source 102. The outlet pipe 212 is couplable to downstream piping leading (directly or indirectly) to the turbine engine 10. The inlet pipe 210 and the outlet pipe 212 are aligned with one another, such that their central bores intersect to provide a flowpath through the frame 208. The valve element resides along the flowpath and is movable within the frame 208 to regulate the flow of fuel 104 passing therethrough by altering the effective size of the flowpath (the "valve area"). Movement of the valve element to constrict the valve area will decrease the mass flow rate of the fuel, and movement to open the valve area will increase the fuel mass flow rate. In this example, the valve element is provided in the form of an elongated metering plug mounted on a stem shaft to move linearly through the interior of the frame 208. For the purposes of this discussion, and given the illustrated orientation of the fuel control valve 200, upward translation corresponds to movement towards an open position and downward translation corresponds to movement towards a closed position. Note that other configurations and assemblies are also envisioned—e.g., rotating butterfly or ball valves.

The actuator 204 acts as a positioner to drive the valve stem, and therefore the valve element, to a specified position within the valve frame 208. In this example, the actuator 204 is an electrical-mechanical assembly including a motor 214 (i.e., a brushless DC motor), a gearbox 216, a tubular casing 218 containing the drive shaft (not shown), and a seal housing 220. During use, the motor 214 provides torque to the gearbox 216, which converts the torque into linear motion of the drive shaft through the tubular casing 218. The drive shaft extends through the tubular casing 218 and couples to the stem carrying the valve element. Dynamic annular seals and bearings (not shown) interact with the drive shaft to inhibit fluid leakage are contained in the seal housing 220.

In this example, the motor 214 includes an integral controller and a primary displacement sensor 215 (shown schematically). The primary displacement sensor 215 may be provided in a variety of forms (e.g., a resolver or a linear variable differential transformer (LVDT)) in different implementations. The actuator 204 further includes a secondary displacement sensor 222 that is directly responsive to linear movement of the drive shaft. This secondary displacement sensor may be used to detect runaway process control by the motor 214 and/or malfunctioning of the driver 206, and also to confirm that the motor's integrated primary displacement sensor 215 is operating correctly. Further, in some examples, while the primary displacement sensor 215 may provide positional feedback for controlling movement of the valve element, the secondary displacement sensor 222 may provide position data for performing wear-related prognostic and diagnostic techniques. For instance, the secondary displacement sensor 222 may be configured to have a lower bandwidth than the primary displacement sensor 215. As such, the secondary displacement sensor 222 may be less suitable for enabling closed-loop control of the valve element, but more suitable for identifying actual valve movement because its feedback signal can be more aggressively filtered.

The driver 206 is communicatively coupled to the actuator 204. Circuitry incorporated within the driver 206 may include one or more processors (e.g., microprocessors) configured to execute computer-readable instructions stored on one or more memory devices. The instructions, when executed by the processors, cause the driver to perform various control operations. In some examples, during use, the driver 206 determines and transmits a valve demand signal 224 that is received and executed by the actuator 204 to alter the position of the valve element within the frame 208 of the valve body 202, as described above. The driver 206 derives the valve demand signal 224 based on the fuel demand signal 42 received from the ECU (see FIG. 2). That is, the driver 206 is configured (e.g., appropriately equipped and programmed) to determine a position of the valve element that corresponds to the valve area needed to physically achieve the mass flow rate indicated by the fuel demand signal 42. The driver 206 also receives from the actuator 204 a valve position signal 226 that incorporates data from the primary and/or secondary displacement sensors 215,222. Note that, in some other examples, the driver 206 may be fully integrated with the actuator 204, such that the driver 206 directly operates the motor 214 of the actuator 204 and directly receives data from the displacement sensors 215,222.

Figure 3:
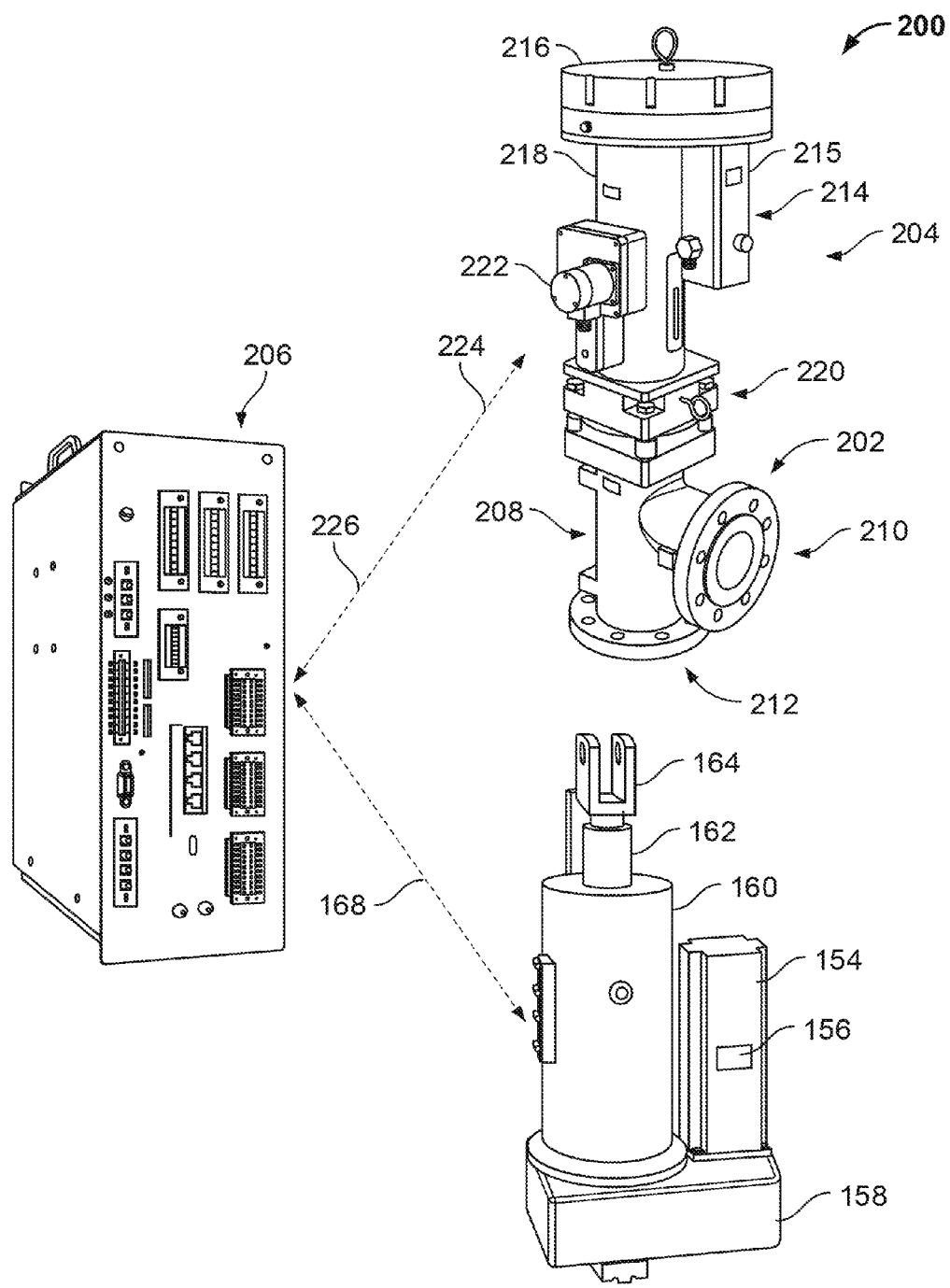
FIG. 3 is a plan view of the variable vane actuator and a fuel control valve of the fuel system of FIG. 2.

FIG. 3 also illustrates the vane actuator 150, which may be controlled by the same or a different driver as the valve actuator 204. Here, the vane actuator 150 is shown communicatively coupled to the driver 206. Note, however, that this configuration, while suitable in certain implementations, is illustrated as such merely for convenience of discussion and is not intended to be limiting in any way. Similar to the valve actuator 204, the vane actuator 150 includes a motor 154 having an integral controller and displacement sensor 156, a gearbox 158, and a tubular casing 160 containing a drive shaft 162. The distal end of the drive shaft 162 includes a coupler 164 attachable to a linkage (not shown) connected to the variable vanes of the compressor 16. Like the valve actuator 204, the vane actuator 150 includes various seals, gears, leadscrews and other components that are subject to wearout over time. During use, the driver 206 derives a vane demand signal 166 based on the air flow demand signal 152 received from the ECU (see FIG. 2), and communicates the demand signal to the vane actuator 150 for execution. The driver 206 also receives from the actuator 150 a vane position signal 168 that incorporates data from the displacement sensor 156. The vane position signal 168 can be used as feedback for closed loop control of the vane actuator, and also for identifying actual actuator movement.

FIGS. 4-9 and the associated discussion are illustrative of certain techniques for selectively identifying "actual device movement." As noted above, by "actual device movement" we refer to the detected travel distance (or displacement) of the device where wear of a particular system component is likely occurring. Notably, this actual valve movement excludes detected displacement that is unlikely to reflect wear. A few non-limiting examples of detected displacement that may not be identified as actual valve movement include: (1) noise in the signal received from the displacement sensor; and (2) detected displacement that corresponds to inherent compliance in the system (i.e., elastic flexing throughout the drivetrain that does not affect the particular component of interest). Note that the examples provided in the context of FIGS. 4-9 correspond to implementations involving a fuel control valve (e.g., the control valve 200), yet it is understood that the associated wear-related prognostic and diagnostic techniques discussed below are equally applicable to implementations involving a vane actuator (e.g., the vane actuator 150) and other suitable turbine control devices. As such, certain terms set forth in the following control valve discussion, such as "actual valve movement" and "total valve travel" should be considered synonymous with "actual device movement" and "total device travel."

Figure 4:
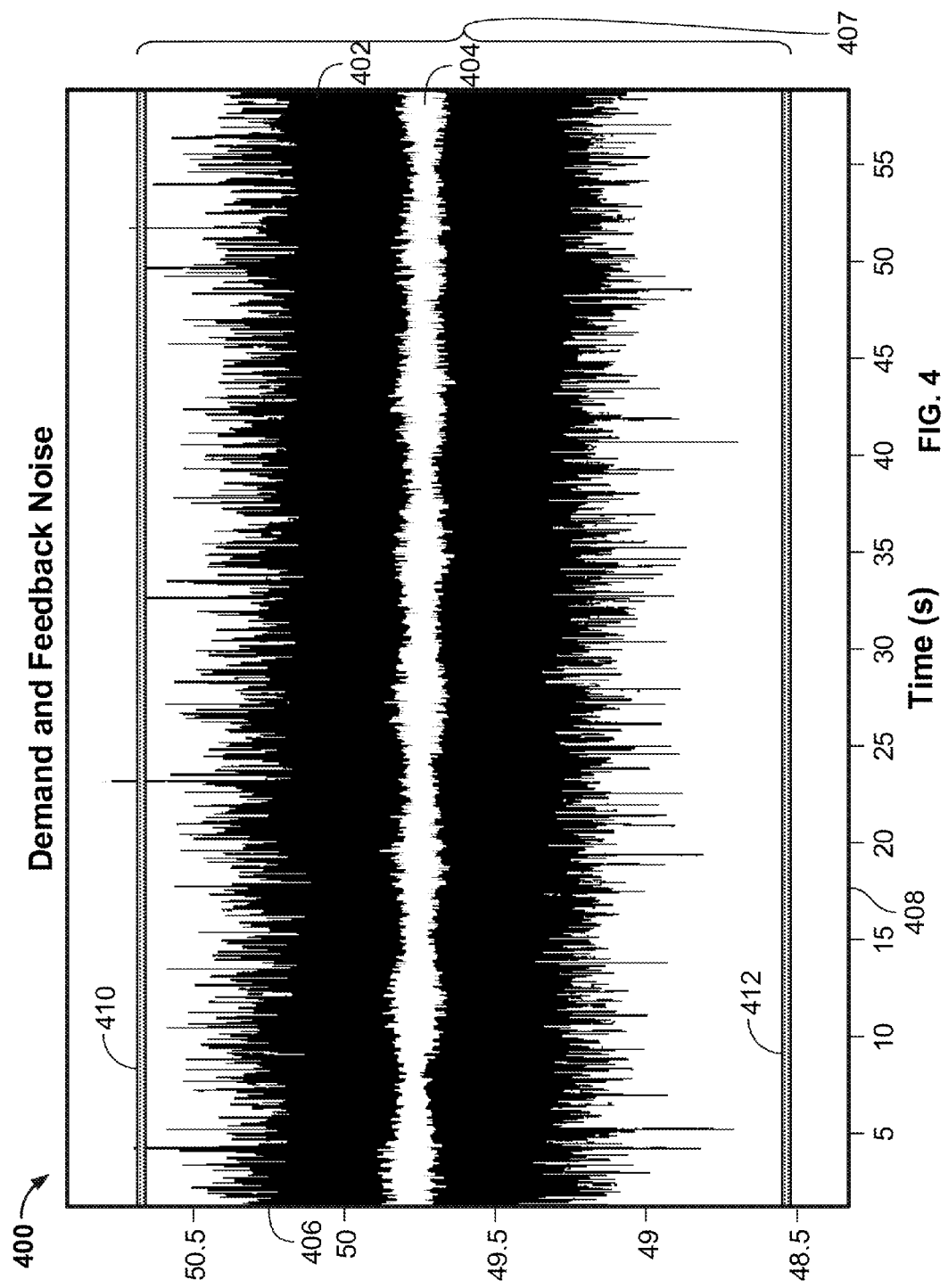
FIG. 4 is a graph plotting filtered and unfiltered valve position signals over time together with a valve movement window.

FIG. 4 provides a graph 400 featuring respective plots of an unfiltered valve position line 402 and a filtered valve position line 404 against a position scale 406 and a time scale 408. The unfiltered position line 402 corresponds to raw data received from a displacement sensor (e.g., displacement sensors 215,222) monitoring a control valve; and the filtered position line 404 corresponds to the same signal after one or more data processing operations. Note that the values of the position scale 406 progress linearly to mimic the translating movement of the valve element described above, with increasing position value corresponding to movement towards an open valve position and decreasing position value corresponding to movement towards a closed valve position. In this example, the underlying data of the graph 400 corresponds to a time interval where the control valve element was not intentionally moved to a different position set point. Yet, as is apparent from a visual inspection of the graph 400, both the unfiltered position line 402 and the filtered position signal line 404 move over time. Movement in the position lines 402,404 is linked with modulation or noise in the feedback signal, because the actuator control drives movement of the actuator drivetrain manipulating the valve element to control the turbine, based on the demand and feedback signals. There is also noise in the data received from the displacement sensor. As demonstrated by a comparison of the position lines 402,404, a certain amount of noise can be removed using filtering techniques, which may be specifically tuned for processing signals in high-frequency response devices (e.g., high performance turbine control valves and vane actuators). However, conventional noise filtering alone is typically not sufficient to track actual device movement in implementations where the response time of the device approaches that of the displacement sensors (e.g., in a turbine engine control context).

In addition to the position lines 402,404, the graph 400 also includes a valve movement window 407 bounded by an upper threshold 410 and a lower threshold 412. Note that the terms "upper" and "lower" are used in this discussion solely for purposes of consistency with the linear position scale 406. The valve movement window 407 is representative of inherent compliance in the drivetrain or sealing system that does not result in significant wear of the monitored system component. For example, in the context of seals that interact with an actuator drive shaft, the span of the movement window 407 corresponds to movement that may be detected by the displacement sensor, but, due to the flex or compliance of the seals, does not result in sliding contact between the seals and the shaft. In some examples, the upper and lower thresholds 410,412 may vary between different implementations. For instance, these thresholds may be determined based on several different factors that are unique to certain valve configurations, such as temperature, pressure, loading, etc. In addition, the threshold values may change, with valve position or loading. Certain factors may also be unique to the type of component being evaluated, such as materials, coatings, structure, etc. Thus, for example, the threshold values for evaluation of a valve seal may be different from those for evaluation of a screw, bearing, or gear. In some examples, the upper and lower thresholds 410,412 are determined based on empirical testing data. As discussed below, techniques for identifying actual valve movement may include determining when the filtered position line 404 moves beyond the thresholds of the movement window 407.

Figure 5:
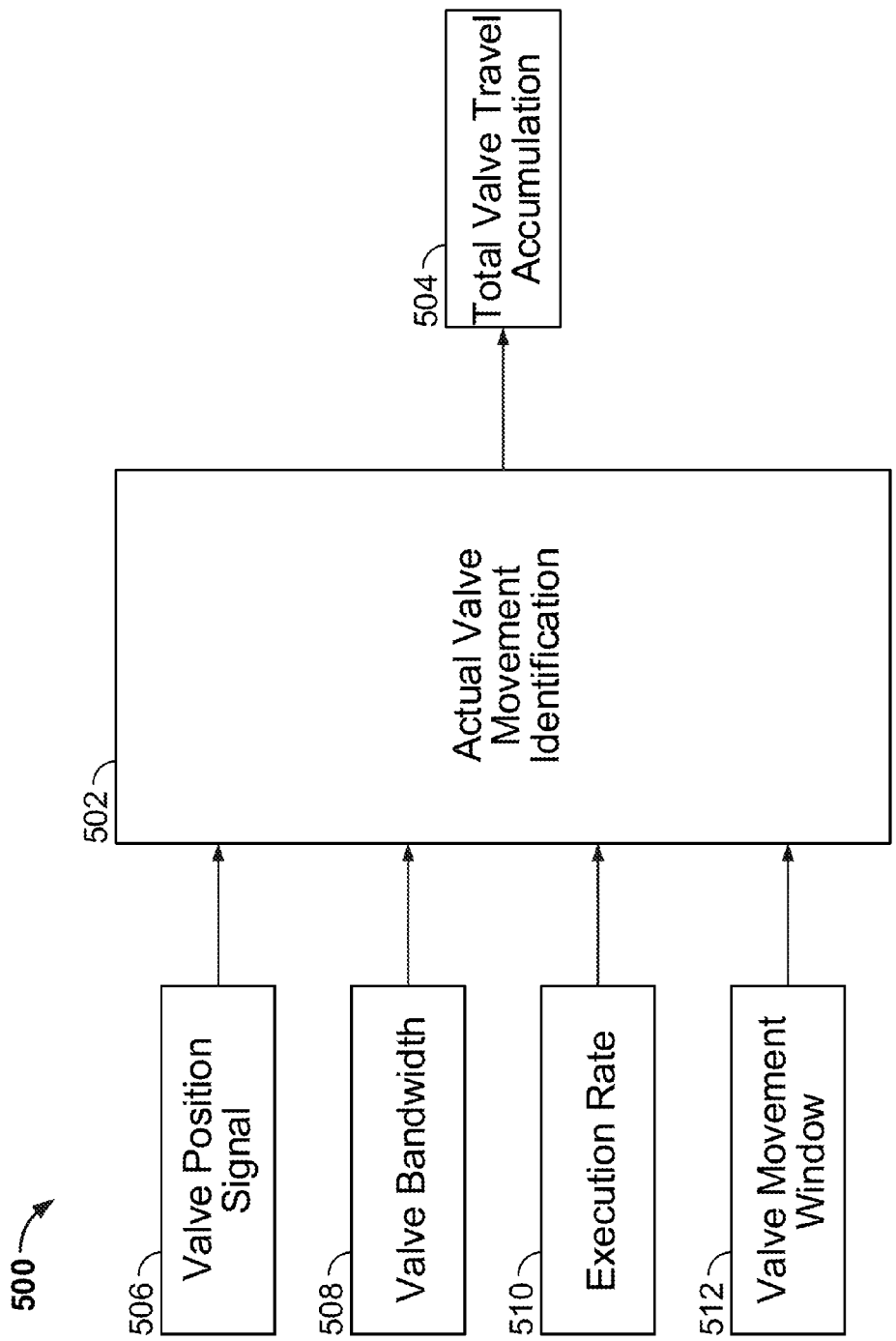
FIG. 5 is a functional diagram illustrating a technique for determining total valve travel.

Turning next to FIG. 5, a functional diagram 500 for tracking total valve travel distance over time includes a process 502 that identifies actual valve movement and a process 504 that accumulates valve travel distance in response to the identification by process 502. As noted above, the process 502 identifies actual valve movement by monitoring the valve position signal 506 and determining when it extends beyond the valve movement window. In some examples, the valve position signal may be the only variable input to the process 502. However, additional variable inputs may be provided in other implementations. The process 502 is characterized by parameters 508-512. Parameter 508 corresponds to the valve bandwidth, the attainable frequency response rate at which the valve operates. The valve bandwidth parameters can be used to adjust the filtering procedures performed on the valve position signal. In some examples, a higher valve bandwidth dictates less aggressive low-pass noise filtering, because the response time of the valve more closely approaches that of the position signal. Parameter 510 corresponds to the execution rate of the process 502. The execution rate may remain constant during the life cycle of a particular valve component, or change over time. For example, the execution rate may increase as the component nears a predicted point of wearout failure. As another example, the execution rate may vary based on the operating conditions of the turbine (e.g., a higher execution rate at peak load). Parameter 512 corresponds to various aspects of the valve movement window— e.g., the upper and lower threshold values (which may be expressed as absolute values or percentages). As noted above, process 504 accumulates valve travel distance based on the actual valve movement identified by process 502. As discussed below, techniques for accumulating valve travel distance may include calculating an incremental valve travel distance as the magnitude difference between the valve position signal and the nearest threshold of the valve movement window.

Figure 6:
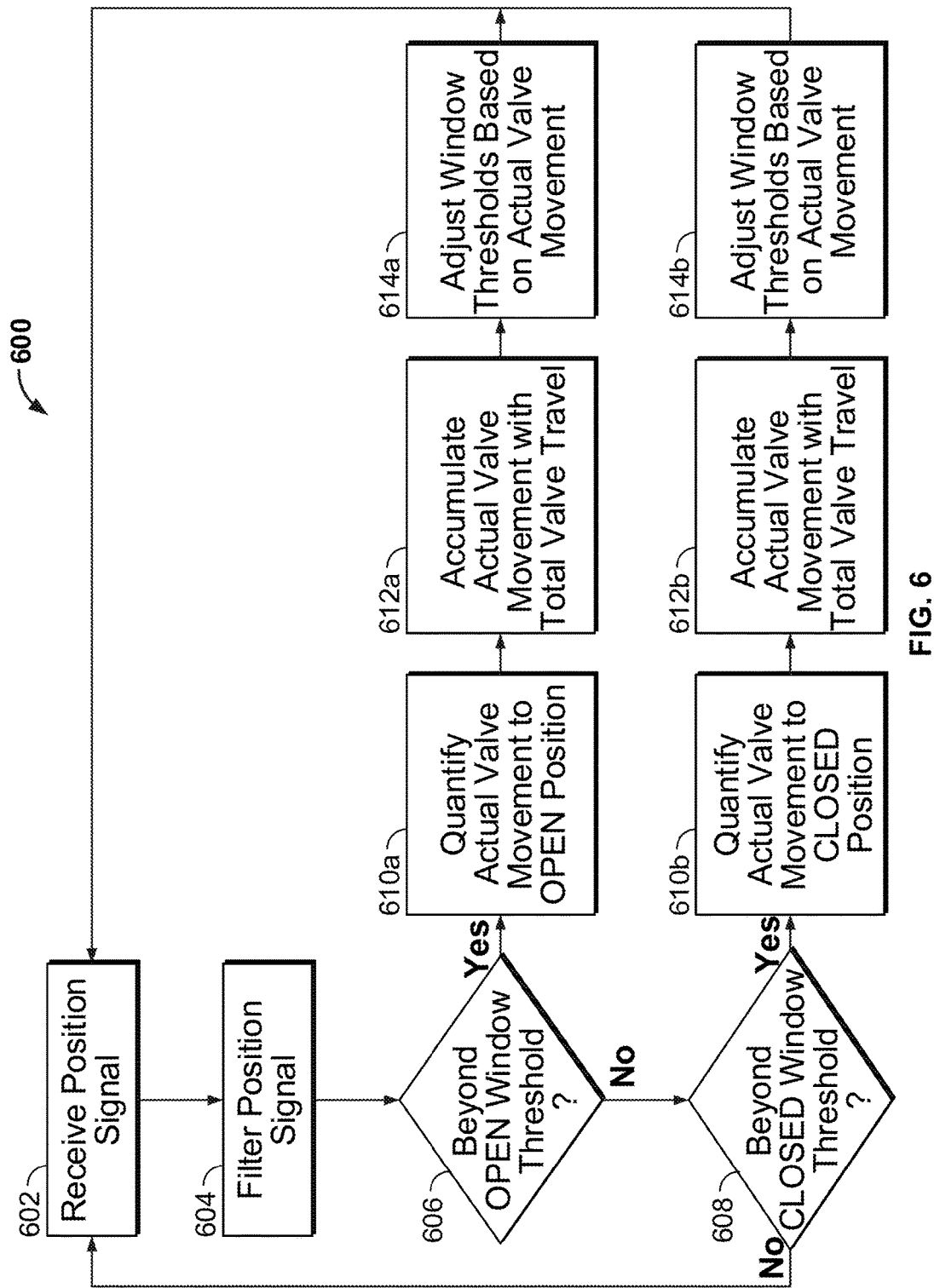
FIG. 6 is a flowchart illustrating a process for determining total valve travel.

FIG. 6 illustrates an example process 600 for determining total valve travel in accordance with one or more embodiments of the present disclosure. The process 600 can be implemented, for example, in connection with one or more computing components of the turbine engine 10, such as the driver 206 of the fuel control valve 200. However, other implementations are also contemplated. For instance, various steps of the process 600 could also be performed by the ECU 40 or a computing system located remote from the turbine engine, yet communicatively coupled thereto. Further, the steps of the process 600 do not require any particular order to achieve desirable results. In addition, other steps may be added to, or certain steps may be eliminated from, the process 600 without departing from the scope of the present disclosure.

According to the process 600, a position signal is received (602). For example, the position signal may be received from a displacement sensor mounted and configured (e.g., provided with suitable hardware and software) to monitor the drivetrain of a fuel control valve. In some examples, the displacement sensor could be integrated with the motor or the gear train of an actuator adjusting the valve element to achieve desired valve areas and corresponding flow rates and/or pressures. In some examples, the displacement sensor may be mounted and configured to monitor the drive shaft of the actuator. The position signal is filtered (604) upon receipt. In some examples, the filtering processes performed on the position signal are selected or parameterized based on the displacement sensor providing the position signal. In some examples, the particular filtering techniques are based on the bandwidth of the control valve. For instance, if a low-pass noise filter is used, the cutoff frequency may be selected based on the valve bandwidth.

The filtered position signal is compared (606) to a valve movement window to determine whether the position signal has surpassed an OPEN threshold. As noted above, the valve movement window is representative of inherent compliance in the drivetrain that does not result in significant wear of the monitored system component. The OPEN threshold corresponds a first boundary of the window in the direction of valve movement that increases the valve area (upward in the example of fuel control valve 200 shown in FIG. 2). The valve movement window also includes a CLOSED threshold corresponding to a second boundary in the direction of valve movement that decreases valve area (downward in example of FIG. 2). If the filtered position signal has not surpassed the OPEN threshold, it is compared (608) to a CLOSED threshold. If the filtered position signal has not surpassed either of the OPEN or CLOSED thresholds, then the process 600 returns to the initial step of receiving (602) a position signal. Conversely, if either of the OPEN or CLOSED thresholds have been surpassed by the filtered position signal, then the actual valve movement is quantified (610a, 610b). In some examples, quantifying actual valve movement includes determining a magnitude difference between the position signal and the nearest threshold. For instance, in context of a linear fuel control valve (e.g., control valve 200), if the OPEN threshold is set at 52% and the filtered position signal represents valve movement to 52.5%, then the quantified actual valve movement would be 0.5%.

The quantified actual valve movement is accumulated (612a, 612b) with a total valve travel value that is tracked over time (e.g., through recurrent cycles of process 600). Notably, in this example, the accumulated actual valve movement accounts for valve travel in either the OPEN or CLOSED direction. Of course, other implementations may involve different techniques for accumulating actual valve movement based on the configuration of the valve and/or the component being monitored for wear. For instance, valve travel in one direction may be weighted more heavily in the accumulation than travel in the opposing direction and/or travel in one direction may be entirely disregarded. Prior to returning to the initial step of receiving (602) a position signal, the valve movement window thresholds (i.e., the OPEN and CLOSED thresholds) are adjusted (614a, 614b) for future cycles based on the quantified actual valve movement. In some examples, adjusting these thresholds includes altering the values based on the actual valve movement. For instance, if actual valve movement in the OPEN direction is identified, the valve movement window thresholds can be adjusted by the quantified amount and in the corresponding direction. Going back to the previous example involving a linear valve, and where the quantified actual valve movement was 0.5% in the OPEN direction, both threshold values would be moved upward by 0.5% to follow the position signal (see FIG. 8).

Figure 7:
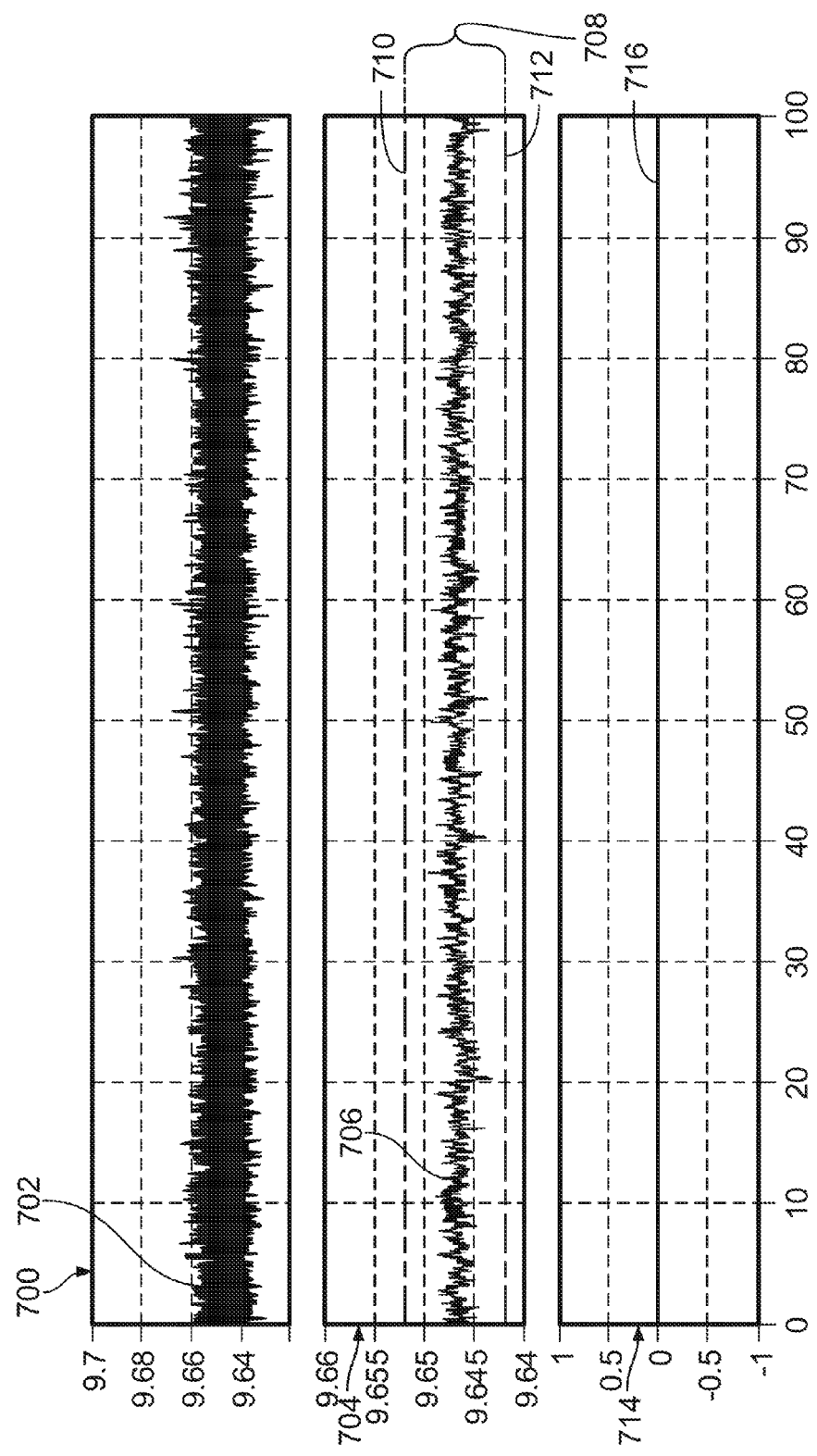
FIG. 7 is a series of graphs plotting valve position and accumulated total valve travel over a first time period.
Figure 8:
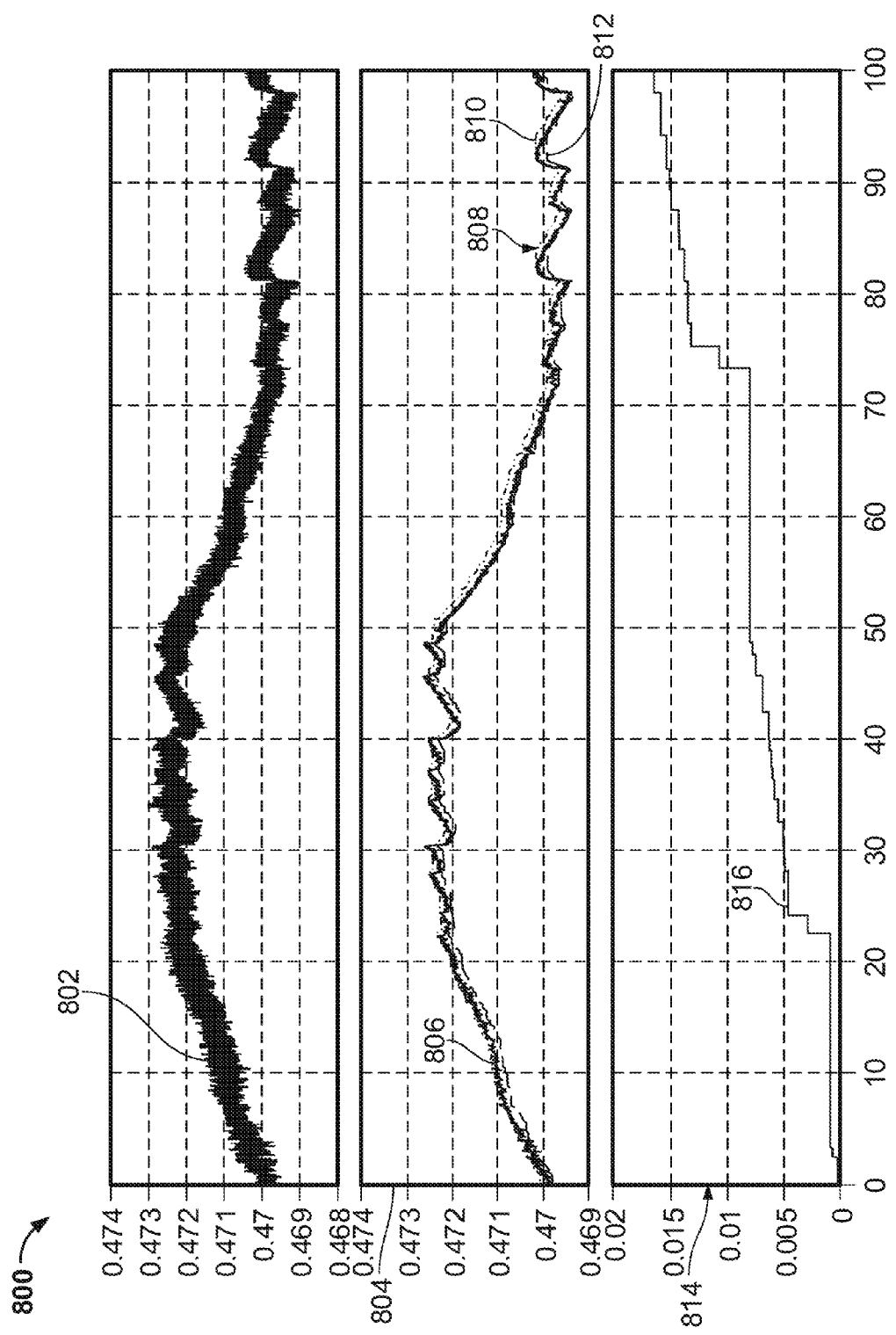
FIG. 8 is a series of graphs plotting valve position and accumulated total valve travel over a second time period.

FIGS. 7 and 8 provide various graphs that are illustrative of the process 600 of FIG. 6. Graphs 700 and 800 include plots of the received unfiltered position signal 702,802. Graphs 704 and 804 include plots of the filtered position signal 706,806 and the valve movement window 708,808 featuring an OPEN threshold 710,810 and an opposing CLOSED threshold 712,812. Graphs 714 and 814 include plots of the accumulated total valve travel 716,816. In the example of FIG. 7, the filtered position signal 706 does not extend beyond the valve movement window 708. As such, the accumulated valve travel 716 and the valve movement window 708 remain unchanged. On the other hand, FIG. 8 shows a filtered position signal 806 that repeatedly extends beyond the valve movement window 808, which causes the accumulated valve travel 816 to steadily increase. Notably, as shown in graph 804, the valve movement window 808 is adjusted at each cycle to follow the filtered position signal 806, as provided in steps 614a, 614b of process 600.

Figure 9:
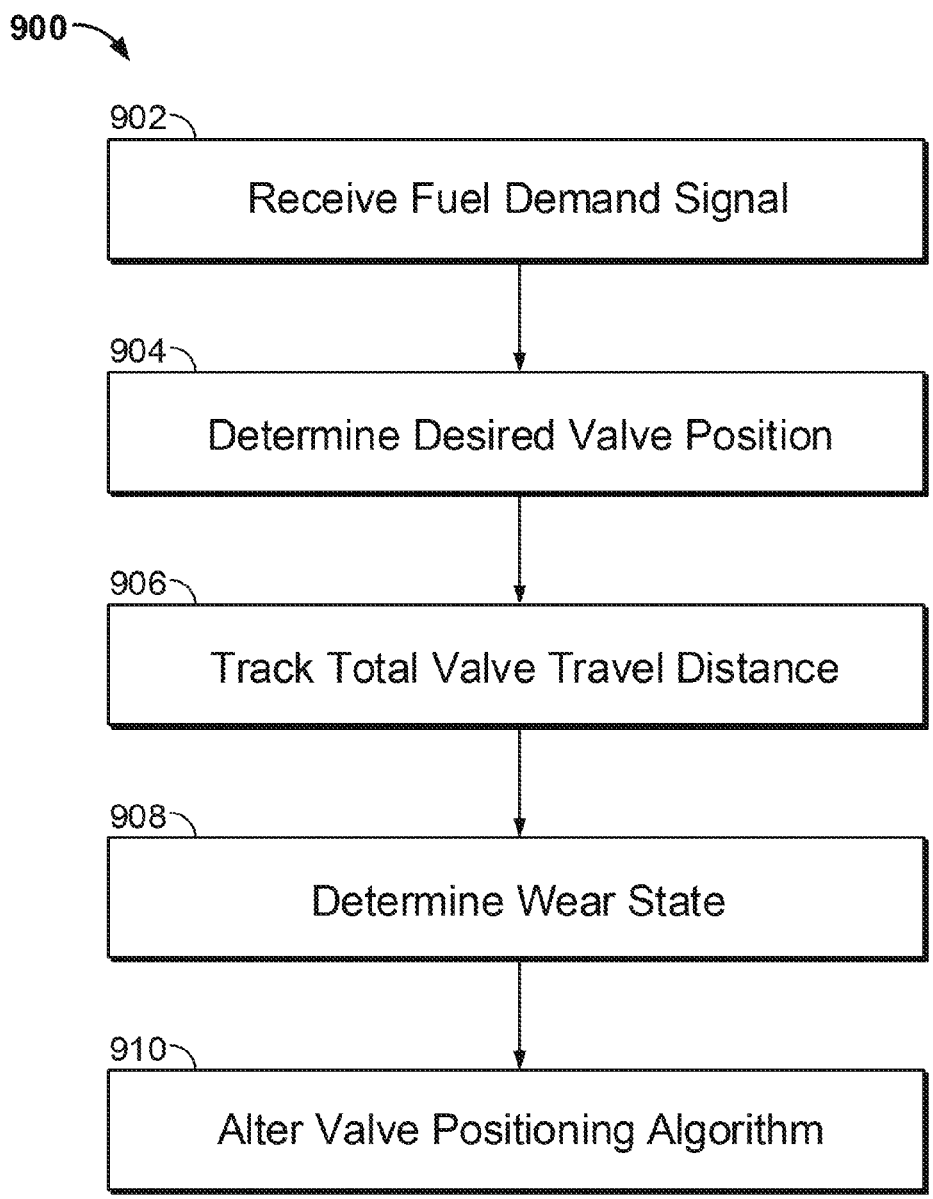
FIG. 9 is a flowchart illustrating a process for operating a fuel control valve.

FIG. 9 illustrates an example process 900 for operating a fuel control valve in accordance with one or more embodiments of the present disclosure. The process 900 can be implemented, for example, in connection with one or more computing components of the turbine engine 10, such as the driver 206 of the fuel control valve 200. However, other implementations are also contemplated. According to the process 900, a fuel demand signal is received (902) and a desired valve position is determined (904) in order to fulfill the fuel demand. This fuel metering sub-process may occur recurrently over time while the turbine engine is active. As the fuel control valve is operated according to the fuel metering sub-process, the total valve travel distance is tracked (906)—for example, by implementing the processes described above with reference to FIGS. 6-8. A wear state of a particular valve component is determined (908) based on the total valve travel distance. In some examples, determining the wear state includes comparing the total valve travel distance to an expected travel capability of the component. The expected travel capability may be provided as one or more predetermined values corresponding to valve travel distances associated with one or more particular wear states. For instance the expected travel capability may include a threshold value (or a range of values) for valve travel distance at which the valve component is recommended for overhaul and/or a threshold value at which the valve component is likely to fail from wearout or experience significant performance degradation (e.g., leakage through a worn seal, slippage in a gear train, and/or backlash due to a worn gear train). In some examples, the wear state determination may further include accounting for (e.g., by adjusting the expected travel capability) other secondary factors which contribute to the wear rate, such as elevated ambient temperature or fuel temperature and fuel pressure, or progressive deterioration of the lubrication system due to combinations of time and ambient temperature.

Travel distance values incorporated in the expected travel capability may be derived from mechanical wear testing, which may be specifically tuned to obtain lifecycle data for a particular valve configuration and a particular component (similar to the valve movement window thresholds discussed above). In some examples, the wear state may be determined in terms of a current state of the valve component, as discussed above. Further, in some examples, the wear state may be determined in terms of a future state of the valve component. For instance the wear state may include a predicted future date for overhaul and/or wearout. Such predictions can be determined by accounting for the current wear state of the valve and one or more historical trends regarding operation of the control valve. For instance, a historical analysis of the valve demand signal and/or the valve position signal can be used to predict future wear of the valve component. The wear state, whether current or predicted, can be used to provide alerts to an operator and/or to alter (910) the valve positioning algorithm used to convert the fuel demand signal to a desired valve position. In some examples, one or more parameters of the algorithm may be changed automatically in response to the determined wear state. For instance, as the valve component approaches the overhaul or wearout state, the valve positioning algorithm may be altered to degrade the rate at which wear is occurring.

A number of embodiments of the invention have been described. Nevertheless, it will be understood that various modifications may be made without departing from the spirit and scope of the inventions.

What is claimed is:

1. A driver communicatively coupled to a turbine control device and a turbine engine control unit (ECU), the driver comprising a memory, a processor, and instructions stored in the memory and operable when executed by the processor to cause the driver to perform operations comprising:
    operating the turbine control device by recurrently:
        receiving a demand signal from the turbine ECU; and
        determining and transmitting a desired position to the turbine control device based on the demand signal; and
    during the operating of the turbine control device, tracking a total device travel distance over time by recurrently:
        selectively identifying actual device movement based on device position data associated with a displacement sensor monitoring the turbine control device by:
            comparing the device position data to a device movement window comprising a predetermined threshold value based on a physical characteristic of the turbine control device; and
            determining that the device position is beyond the device movement window; and
        accumulating an incremental device travel distance corresponding to the identified actual device movement with the total device travel distance.

2. The driver of claim 1, wherein the turbine control device comprises at least one of a turbine fuel control valve and a variable vane actuator.

3. The driver of claim 1, wherein tracking the total device travel distance further comprises filtering a device position signal received from the displacement sensor.

4. The driver of claim 1, wherein the physical characteristic is associated with at least one of a seal, a gear, a bearing, and a leadscrew of the turbine control device.

5. The driver of claim 1, wherein the device movement window comprises two opposing threshold values.

6. The driver of claim 1, wherein tracking the total device travel distance further comprises:
    in response to identifying actual device movement, adjusting the device movement window based on the incremental device travel distance.

7. The driver of claim 1, wherein tracking the total device travel distance further comprises:
    calculating the incremental device travel distance as the magnitude between the device position data and the device movement window.

8. The driver of claim 1, wherein the operations further comprise comparing the total device travel distance to an expected travel capability to determine a wear state of the turbine control device.

9. The driver of claim 8, wherein determining the wear state of the turbine control device further comprises adjusting the expected travel capability based on at least one of: ambient temperature conditions, fuel temperature conditions, fuel pressure conditions, actuator load conditions, and lubrication effectiveness.

10. The driver of claim 1, wherein the operations further comprise automatically altering a parameter for determining the desired device position based on the total device travel distance.

11. A computer-implemented method for providing wear-related prognostics and diagnostics on a turbine engine, the method being executed using one or more processors and comprising:
    operating a turbine control device by recurrently:
        receiving a demand signal from a turbine engine control unit (ECU); and
        determining and transmitting a desired position to the turbine control device based on the demand signal; and
    during the operating of the turbine control device, tracking a total device travel distance over time by recurrently:
        selectively identifying actual device movement based on device position data associated with a displacement sensor monitoring the turbine control device by:
            filtering a device position signal received from the displacement sensor to provide the device position data;
            comparing the device position data to a device movement window comprising a predetermined threshold value based on a physical characteristic of the turbine control device; and
            determining that the device position is beyond the device movement window; and
        accumulating an incremental device travel distance corresponding to the identified actual device movement with the total device travel distance.

12. The method of claim 11, wherein the turbine control device comprises at least one of a turbine fuel control valve and a variable vane actuator.

13. The method of claim 11, wherein the physical characteristic is associated with at least one of a seal, a gear, a bearing, and a leadscrew of the turbine control device; and wherein the device movement window comprises two opposing threshold values.

14. The method of claim 11, wherein tracking the total device travel distance further comprises:
in response to identifying actual device movement, adjusting the device movement window based on the incremental device travel distance; and
calculating the incremental device travel distance as the magnitude between the device position data and the device movement window.

15. The method of claim 11, further comprising: comparing the total device travel distance to an expected travel capability to determine a wear state of the turbine control device.

16. The method of claim 11, further comprising: automatically altering a parameter for determining the desired device position based on the total device travel distance.

17. A non-transitory computer-readable storage medium coupled to one or more processors and having instructions stored thereon which, when executed by the one or more processors, cause the one or more processors to perform operations for providing wear-related prognostics and diagnostics on a turbine engine, the operations comprising:
operating a turbine control device by recurrently:
receiving a demand signal from a turbine engine control unit (ECU); and
determining and transmitting a desired position to the turbine control device based on the demand signal; and
during the operating of the turbine control device, tracking a total device travel distance over time by recurrently:
selectively identifying actual device movement based on device position data associated with a displacement sensor monitoring the turbine control device by:
filtering a device position signal received from the displacement sensor to provide the device position data;
comparing the device position data to a device movement window comprising a predetermined threshold value based on a physical characteristic of the turbine control device; and
determining that the device position is beyond the device movement window; and
accumulating an incremental device travel distance corresponding to the identified actual device movement with the total device travel distance.

18. The computer-readable storage medium of claim 17, wherein the turbine control device comprises at least one of a turbine fuel control valve and a variable vane actuator.

19. The computer-readable storage medium of claim 17, wherein the physical characteristic is associated with at least one of a seal, a gear, a bearing, and a leadscrew of the turbine control device; and wherein the device movement window comprises two opposing threshold values.

20. The computer-readable storage medium of claim 17, wherein tracking the total device travel distance further comprises:
in response to identifying actual device movement, adjusting the device movement window based on the incremental device travel distance; and
calculating the incremental device travel distance as the magnitude between the device position data and the device movement window.

21. The computer-readable storage medium of claim 17, wherein the operations further comprise: comparing the total device travel distance to an expected travel capability to determine a wear state of the turbine control device.

22. The computer-readable storage medium of claim 17, wherein the operations further comprise: automatically altering a parameter for determining the desired device position based on the total device travel distance.

* * * * *